United States Patent
Cameau et al.

(10) Patent No.: US 9,909,455 B2
(45) Date of Patent: Mar. 6, 2018

(54) INTERMEDIATE CASING FOR A TURBOFAN ENGINE

(71) Applicant: Snecma, Paris (FR)

(72) Inventors: Jerome Etienne Robert Cameau, Moissy-Cramayel (FR); Laurent Donatien Behaghel, Moissy-Cramayel (FR); Kévin Michel Robert Contal, Moissy-Cramayel (FR); Sébastien Nicolas Juigne, Moissy-Cramayel (FR)

(73) Assignee: Sneema, Paris (FR)

( * ) Notice: Subject to any disclaimer, the term of this patent is extended or adjusted under 35 U.S.C. 154(b) by 272 days.

(21) Appl. No.: 14/794,005

(22) Filed: Jul. 8, 2015

(65) Prior Publication Data

US 2016/0010501 A1    Jan. 14, 2016

(30) Foreign Application Priority Data

Jul. 9, 2014 (FR) ...................................... 14 56635

(51) Int. Cl.
*F01D 25/24* (2006.01)
*F01D 25/08* (2006.01)
(Continued)

(52) U.S. Cl.
CPC ............. *F01D 25/24* (2013.01); *F01D 9/065* (2013.01); *F01D 25/08* (2013.01); *F01D 25/18* (2013.01);
(Continued)

(58) Field of Classification Search
CPC ...... F02C 7/32; F02C 7/12; F02C 7/14; F01D 25/12; F01D 25/18; F01D 25/24;
(Continued)

(56) References Cited

U.S. PATENT DOCUMENTS 2,566,049 A    8/1951 Williams
2,770,946 A *  11/1956 Savin .................... F01D 21/006
                                                60/39.08
(Continued)

FOREIGN PATENT DOCUMENTS

EP    2045447 A1    4/2009
FR    2899272 A1 * 10/2007 ............. F01D 9/065
(Continued)

OTHER PUBLICATIONS

Machine Translation of FR 2899272 A1.*

*Primary Examiner* — Woody Lee, Jr.
*Assistant Examiner* — Elton Wong
(74) *Attorney, Agent, or Firm* — Blank Rome LLP

(57) ABSTRACT

An intermediate casing comprising an inner annular hub, an outer annular barrel and an annular part for separating flows situated between the hub and the outer barrel. A primary stream is delimited between the hub and the separation part. A secondary stream is delimited between the separation part and the outer barrel. At least one hollow arm extends radially from the hub to the outer barrel, passing through the primary and secondary streams. A transmission shaft extends radially in the hollow arm. The hollow arm comprises a hydraulic-fluid outlet situated downstream of the transmission shaft. The arm further comprises a bypass channel or pocket able to bypass the transmission shaft.

11 Claims, 4 Drawing Sheets

(51) Int. Cl.
*F01D 25/18* (2006.01)
*F01D 9/06* (2006.01)
*F02C 7/32* (2006.01)

(52) U.S. Cl.
CPC ............ *F02C 7/32* (2013.01); *F05D 2220/36* (2013.01); *F05D 2240/60* (2013.01); *F05D 2260/606* (2013.01); *F05D 2260/98* (2013.01)

(58) Field of Classification Search
CPC . F01D 9/065; F01D 25/08; F01D 9/06; F05D 2260/606; F05D 2240/60
See application file for complete search history.

(56) References Cited

U.S. PATENT DOCUMENTS

| | | | |
|---|---|---|---|
| 3,907,386 A | | 9/1975 | Kasmarik et al. |
| 5,483,792 A | * | 1/1996 | Czachor ................ F01D 25/162 60/796 |
| 2009/0104027 A1 | * | 4/2009 | Duchatelle .............. F01D 9/065 415/175 |

FOREIGN PATENT DOCUMENTS

| | | |
|---|---|---|
| FR | 2921973 A1 | 4/2009 |
| FR | 2971816 A1 | 8/2012 |

* cited by examiner

INTERMEDIATE CASING FOR A TURBOFAN ENGINE

BACKGROUND OF THE INVENTION

1. Field of the Invention

The present invention relates to an intermediate casing for a turbofan engine, in particular for an aircraft turbofan.

2. Description of the Related Art

A twin-spool jet engine comprises conventionally, from upstream to downstream in the direction of flow of air or gas, a low-pressure compressor, a high-pressure compressor, a combustion chamber, a high-pressure turbine and a low-pressure turbine, which define a primary gas flow. The high-pressure turbine is constrained to rotate with the high-pressure compressor, via a so-called high-pressure shaft, so as to form a high-pressure body, while the low-pressure turbine is constrained to rotate with the low-pressure compressor via a low-pressure shaft so as to form a low-pressure body. Each turbine thus drives the associated compressor in rotation about an axis of the turbofan, under the effect of the thrust of the gases issuing from the combustion chamber.

Moreover, a twin-spool turbofan comprises a fan, surrounded or streamlined by a nacelle and able to generate a flow of air referred to as the secondary flow, said fan generally being rotated by the low-pressure turbine.

In a double-flow twin-spool turbofan, the term intermediate casing is given to a casing comprising a radially inner hub and a radially outer barrel, connected by radial arms, part of the annular separation being situated radially between the inner hub and the outer barrel. The inner hub, the outer barrel and the separation part are coaxial, the separation part having the radial arms passing through it. These arms are structural, that is to say are arranged so as to support elements of the structure and absorb and/or transmit forces.

The inner hub and the separation part delimit a part of the flow stream of the primary flow, referred to as the primary stream. The separation part and the outer barrel delimit a part of the flow stream of the secondary flow, referred to as the secondary stream. The radial arms pass through the primary and secondary streams.

At least one of the aforementioned arms is hollow and allows services to pass. These services may be:
- pipes through which hydraulic fluids pass, such as pipes supplying or returning lubricating or cooling oil,
- mechanical members transmitting power, for driving in particular the accessory gearbox (AGB),
- ventilation channels,
- electric cables, connected for example to various sensors.

The patent FR 2 921 973 discloses an intermediate casing for a turbofan comprising an inner hub and an outer barrel connected by radial arms, at least one of which is hollow and houses a transmission shaft arranged to take off the power from the shafts of the high-pressure and low-pressure bodies in order to transfer it to the accessory gearbox with a view to driving auxiliary devices. The hollow arm passes through an annular separation part.

The internal space of the hollow arm makes it possible to discharge oil coming from the inner hub and serving to lubricate bearings supporting the aforementioned shafts of the low-pressure and high-pressure bodies.

The main cross section of these hollow arms is relatively high. In other words, the cross section of flow enabling oil to pass inside the hollow arm, round the transmission shaft, is relatively great. The main cross section is the largest dimension of the arm perpendicular to the chord.

There currently exists a need to reduce the influence of the structural arms on the flow of the primary and secondary flows. One solution is then to reduce the main cross section of the arms, in particular of the hollow arm, which limits the cross section of flow of oil, in particular the cross section of flow of oil around the transmission shaft.

There also exists a need to guarantee the circulation of oil from a region situated upstream of said transmission shaft to an outlet connected to the filtering and pumping equipment, and to equip the arm with an oil outlet situated downstream of the transmission shaft, while the oil to be discharged may come from a region situated upstream of said transmission shaft. The flow of oil that can be brought from the upstream region as far as the downstream outlet is then limited by the cross section of flow between the walls of the hollow arm and the transmission shaft. This cross section and the corresponding oil flow are more limited, the smaller the main cross section.

The terms upstream and downstream are defined here with respect to the axis of the turbofan and with reference to the direction of circulation of the primary and secondary flows.

SUMMARY OF THE INVENTION

The aim of the invention is in particular to afford a simple, effective and economical solution to the above-noted problem.

To this end, it proposes an intermediate casing for a turbofan comprising a radially internal annular hub, a radially external annular barrel and an annular flow-separation part situated radially between the hub and the outer barrel, a primary stream for flow of a primary flow being delimited between the hub and the separation part, a secondary stream allowing flow of a secondary flow being delimited between the separation part and the outer barrel, at least one hollow arm extending radially from the hub to the outer barrel passing through the primary and secondary streams, a transmission shaft extending radially in said hollow arm, characterised in that the hollow arm comprises a hydraulic-fluid outlet situated downstream of the transmission shaft with respect to the direction of circulation of the primary flow or secondary flow, said arm further comprising a bypass channel able to bypass the transmission shaft and extending from upstream to downstream of said transmission shaft.

The formation of a bypass channel makes it possible to create locally a passage of hydraulic fluid with a larger cross section, so as to enable or facilitate the passage of hydraulic fluid from upstream to downstream, bypassing the transmission shaft, in order to reach the outlet situated at the downstream part of the arm.

Hydraulic fluid means a lubricating fluid or a cooling fluid, such as for example oil.

The arm may comprise first and second walls delimiting the arm externally, extending radially and joining at an upstream edge, said bypass channel being formed by a hollow region produced in the first wall and/or the second wall of the arm and emerging in the internal space of the arm.

Preferably, said bypass channel is formed in the region of the arm passing through the separation part.

Since this region is not situated in the primary and secondary streams, the presence of the bypass channel does not locally interfere with the primary flow or the secondary flow.

In addition, the internal space of the arm may comprise a sealing partition sealingly surrounding the transmission shaft and situated radially outside the bypass channel and the fluid outlet, so as to force the hydraulic fluid to pass through the bypass channel and the hydraulic-fluid outlet.

Moreover, a pipe may be connected to the outlet of the hydraulic-fluid outlet, said pipe extending radially from said outlet to the radially external barrel passing through the secondary stream, said pipe being situated, at least partly, in a cowling extending in the secondary stream.

Furthermore, the arm may comprise at least one hydraulic-fluid inlet situated upstream of the transmission shaft.

The hydraulic-fluid inlet may be formed in the radially internal hub.

Moreover, the radially internal end of the hollow arm may emerge in a chamber formed by the inner hub. The hydraulic fluid contained in the chamber may then enter the internal space of the hollow arm through the radially inner end of the arm.

Moreover, at least one inner hub 8 and the bypass channel or pocket 30 of the intermediate casing may be made in one piece, for example by casting.

The invention also concerns a turbofan comprising at least one intermediate casing of the aforementioned type.

BRIEF DESCRIPTION OF THE DRAWINGS

The invention will be better understood and other details, features and advantages of the invention will emerge from a reading of the following description given by way of non-limitative example with reference to the accompanying drawings, in which.

DETAILED DESCRIPTION OF THE PREFERRED EMBODIMENTS

Figure 1:
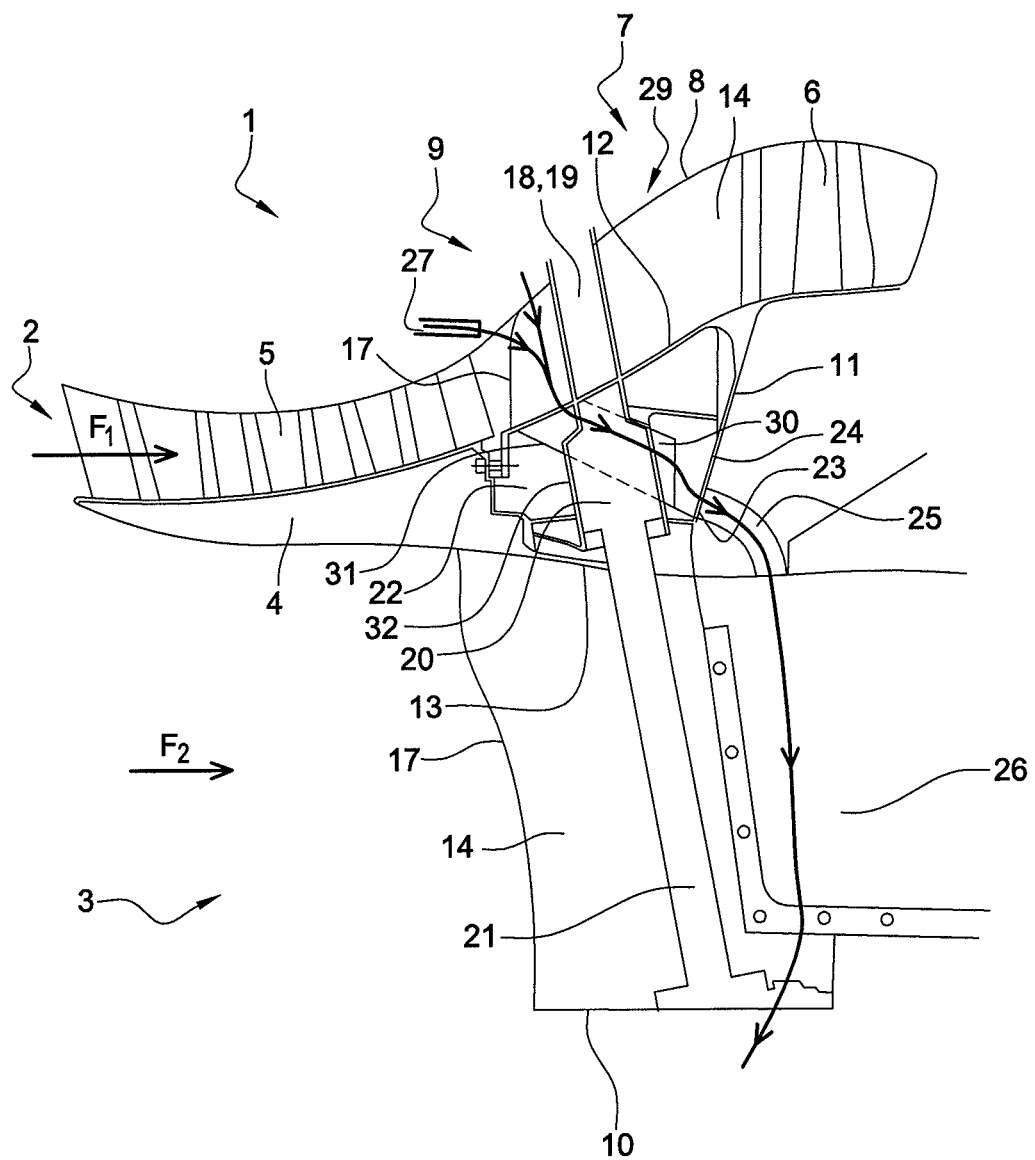
FIG. 1 is a schematic view in axial section of a part of a turbofan, illustrating in particular an intermediate casing according to the invention.
Figure 2:
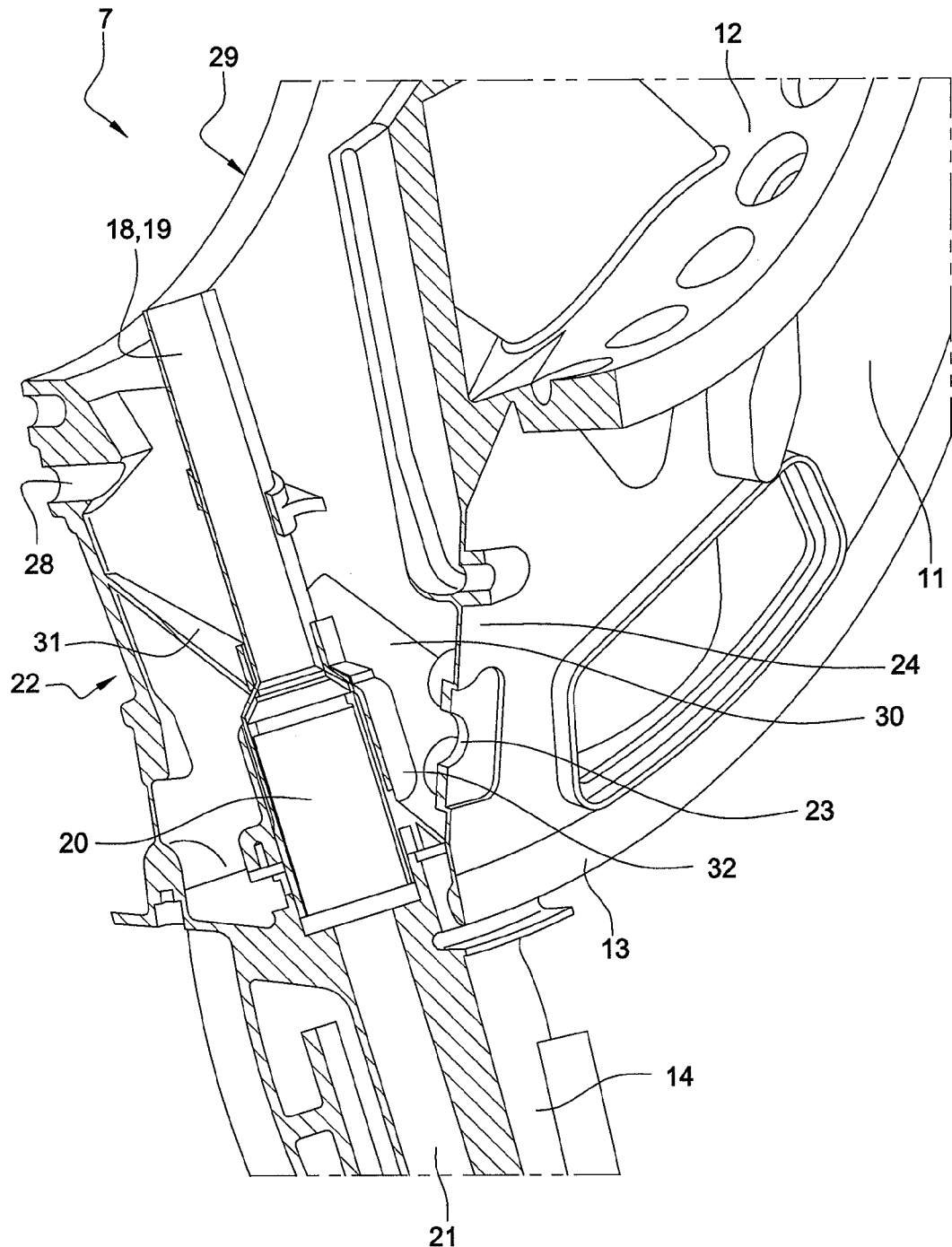
FIGS. 2 to 4 are views in perspective and radial section of a part of an intermediate casing according to the invention.

FIG. 1 depicts a turbofan 1 with double flow F1, F2 according to an embodiment of the invention. This comprises a primary stream 2 intended for the flow of a primary flow of gas and a secondary stream 3 intended for the flow of a secondary flow of gas, separated from each other in particular by a separation nose 4, as is known per se. The turbofan 1 lies along a longitudinal axis XX.

The primary stream 2 comprises in particular a low-pressure compressor 5 and a high-pressure compressor 6.

The turbofan 1 further comprises an intermediate casing 7 comprising a radially inner hub 8 delimiting a chamber 9 housing in particular bearings (not shown) supporting the shafts of the low-pressure and high-pressure bodies extending along the axis XX, and a radially outer barrel 10. The inner hub 8 and the outer barrel 10 are connected by structural arms extending radially. The intermediate casing 7 further comprises a part 11 separating the primary F1 and secondary F2 flows, situated in line with the separation nose 4, downstream thereof, and with the structural arms passing through it.

The separation part 11 comprises a radially internal wall 12 and a radially external wall 13.

The radially internal wall 12 and the inner hub 8 delimit a part of the primary stream 2, while the radially external wall 13 and the outer barrel 10 delimit a part of the secondary stream 3.

At least one of the structural arms, in this case the arm 14 extending vertically at the bottom part of the turbofan, that is to say the arm 14 designated as being at "6 o'clock" in azimuth, is a hollow arm.

This comprises a first wall 15 (FIG. 3) and a second wall 16 (FIG. 4) extending radially, connected at their upstream edge 17 so as to form a leading edge. The two walls 15, 16 form for example, at least in the regions of the arm 14 lying in the primary stream 2 and/or in the secondary stream 3, a lower-surface wall and upper-surface wall. In these regions, the main cross section of the arm 14 is relatively small. Main cross section means the largest transverse dimension of the arm (perpendicular to the chord) between the first wall 15 and the second wall 16.

The hollow arm 14 has, over its entire radial dimension, a power transmission shaft 18 passing through it, arranged to take off the power from the shafts of the high-pressure and low-pressure bodies in order to transfer it to an accessory gearbox (not shown) with a view to driving auxiliary devices.

The shaft 18 comprises a radially internal part 19 having a first diameter, a middle part 20 having a second diameter, and a radially external part 21 having a third diameter. The second diameter is greater than the first diameter and the third diameter. The middle part 20 is situated in the region 22 of the arm 14 passing through the separation part 11 of the intermediate casing 7.

This region 22 of the arm 14 further comprises at least one hydraulic-fluid outlet, in the form of an orifice 23 situated at a downstream end 24 of the arm, a pipe 25 extending from said orifice 23 downstream of the arm 14 and radially towards the outside, as far as the outer barrel, with a view to supplying a pump. The pipe 25 is shown only in FIG. 1. The pipe 25 passes in particular through a fairing or cowling 26 lying in the secondary stream 3. The fairing or cowling 26 extends the corresponding region of the arm 14 downstream.

Figure 5:
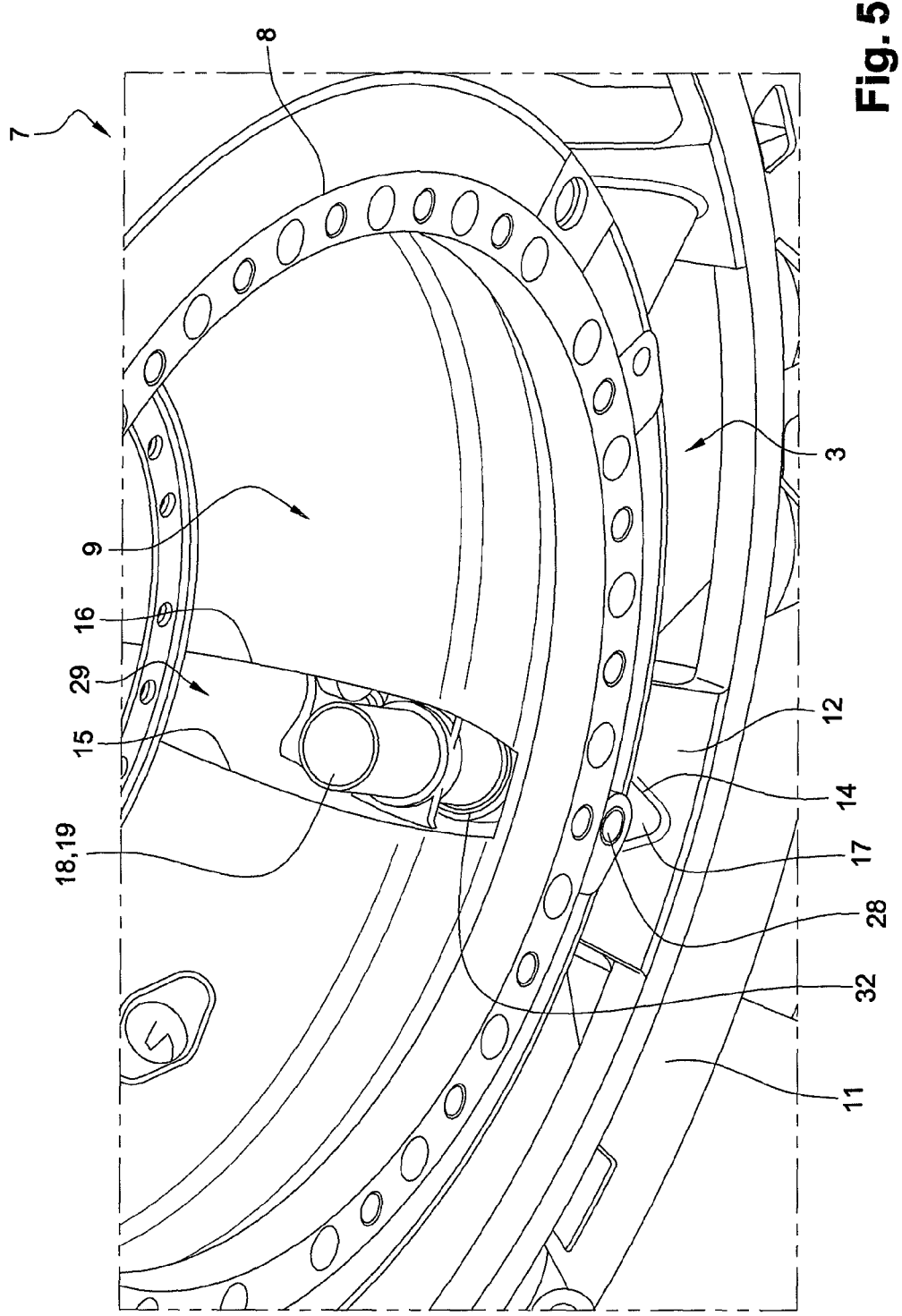
FIG. 5 is a detailed perspective view of a part of an intermediate casing according to the invention, seen from the upstream end.

Oil coming from the aforementioned bearings is intended to enter the arm 14. More particularly, the arm may pass through a tube referenced 27 in FIG. 1 and situated at the inner hub 8 of the intermediate casing 7, said tube 27 emerging in an orifice 28 (FIG. 5) of the arm 14 situated upstream of the shaft 18. Oil may also enter from the chamber 9 formed by the inner hub 8, at the radially internal end 29 of the hollow arm 14, emerging in said chamber 9, both at the region situated upstream of the shaft 18 and the region situated downstream of the shaft 18 (FIG. 5).

Each of the walls 15, 16 of the arm 14 comprises, in the region 22 passing through the part 11 separating the streams F1, F2, a hollow region 30 forming a bypass channel or pocket extending from a region situated upstream of the shaft 18 as far as a region situated downstream. The hollow region 30 emerges in the internal space of the arm 14 and extends along an axis oblique with respect to the axis XX of the turbofan 1. In particular, the axis of the hollow region 30 is inclined radially from inside to outside and from upstream to downstream, at an angle of between 15° 75° with respect to the axis of the turbofan. The two hollow regions 30 are disposed opposite each other.

Figure 4:
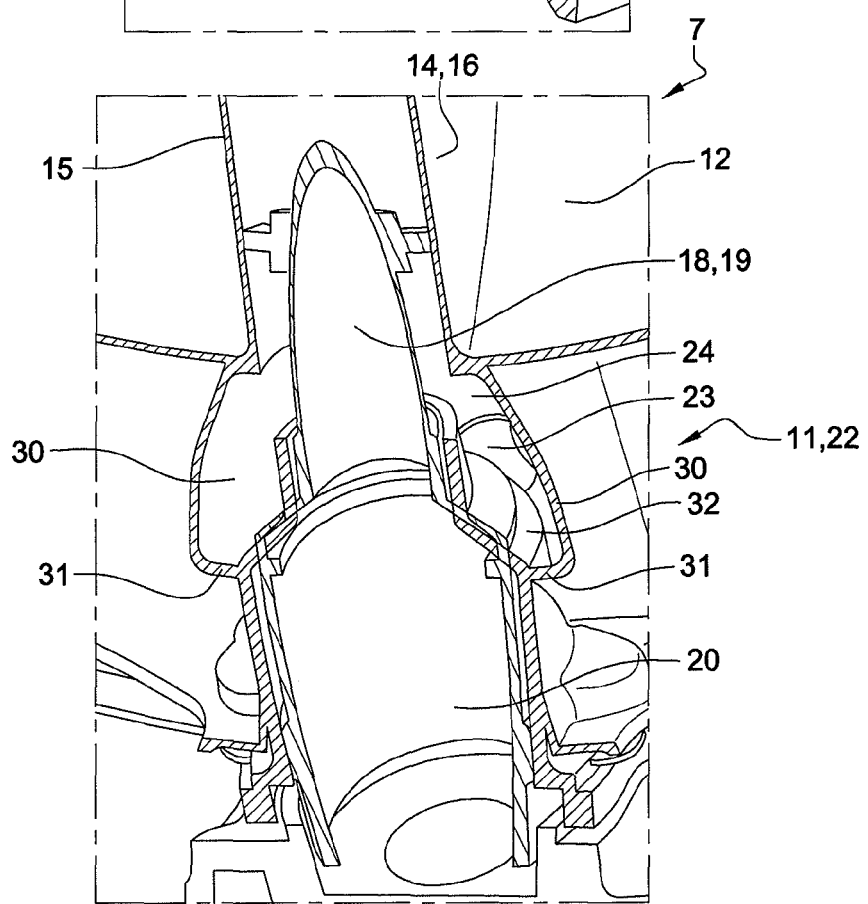

Each hollow region 30 forms, seen from the outside of the arm, a projecting region, as is more clearly visible in FIG. 4.

The hollow regions 30 facilitate the passage of oil from the region of the internal space of the arm 14 situated upstream of the shaft 18 as far as the region of the internal space of the arm 14 situated downstream of the shaft 18, where the oil is next directed to the aforementioned pump by means of the outlet orifice 23 and the pipe 25. This is because these hollow regions 30 locally increase the cross section of flow of the oil intended to bypass the shaft 18, from upstream to downstream.

The internal space of the arm 14 further comprises a sealing partition 31 extending substantially transversely over the entire free cross section of said internal space of the arm 14 and sealingly surrounding the shaft 18. In particular, the shaft 18 is surrounded by a sheath 32 in the region 22 of the arm 14, the partition 31 being connected sealingly to said sheath 32. At least part of the sheath 32 extends radially inwards from the partition 31.

Partition 31 is situated radially outside said hollow regions 30 and the outlet orifice 23. Said partition 31 thus prevents oil from flowing radially to the outside of the partition 31 and forces the oil to be directed to the outlet orifice 23, bypassing the sheath 32 and the shaft 18.

The partition 31 extends along an inclined plane radially from inside to outside and from upstream to downstream, at an angle of between 15° and 75° with respect to the axis XX of the turbofan 1.

Figure 3:
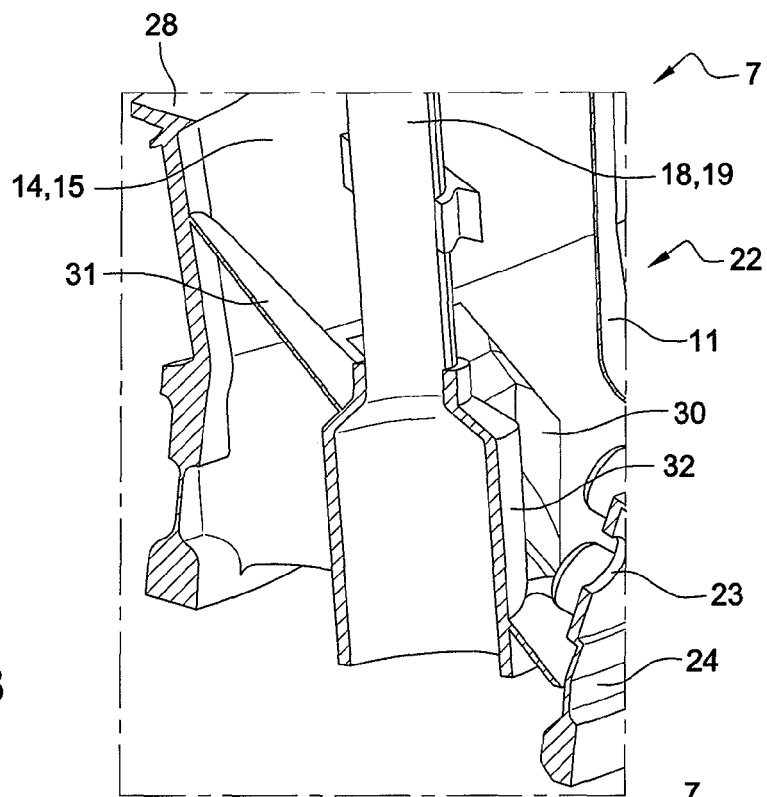

The intermediate casing 7 according to the invention thus makes it possible to have a hollow arm 14 able to fulfil its structural function (absorption of forces, holding of the structure) and its function of passage of services, said arm 14 having as small an impact as possible on the flow of the primary F1 and secondary F2 flows while effectively providing the passage of oil from the hub 8 to the pump of the corresponding oil circuit. In a preferred embodiment, at least the inner hub 8 and the bypass channel or pocket 30 of the intermediate casing are made in one piece, by casting, as shown in FIGS. 3 to 5.

The invention claimed is:

1. An intermediate casing for a turbofan comprising:
a radially internal annular hub;
a radially external outer barrel;
an annular flow-separation part situated radially between the hub and the outer barrel;
a primary stream for flow of a primary flow being delimited between the hub and the separation part;
a secondary stream allowing flow of a secondary flow being delimited between the separation part and the outer barrel;
at least one hollow arm extending radially from the hub to the outer barrel passing through the primary and secondary streams; and
a transmission shaft extending radially in said hollow arm,
wherein the hollow arm comprises a hydraulic-fluid outlet situated downstream of the transmission shaft with respect to the direction of circulation of the primary flow or secondary flow, said arm further comprising a bypass channel or pocket able to bypass the transmission shaft and extending from upstream to downstream of said transmission shaft.

2. An intermediate casing according to claim 1, wherein the arm comprises first and second walls externally delimiting the arm, extending radially and joining at an upstream edge, said bypass channel or pocket being formed by a hollow region produced in the first wall and/or the second wall of the arm and emerging in the internal space of the arm.

3. An intermediate casing according to claim 2, wherein the hollow region extends along an axis inclined radially from inside to outside and from upstream to downstream, at an angle between 15 degrees and 75 degrees with respect to an axis of a turbofan.

4. An intermediate casing according to claim 1, wherein the bypass channel is formed in the region of the arm passing through the separation part.

5. An intermediate casing according to claim 1, wherein the internal space of the arm comprises a sealing partition sealingly surrounding the transmission shaft, situated radially outside the bypass channel or pocket and the hydraulic-fluid outlet.

6. An intermediate casing according to claim 1, wherein a pipe is connected to the hydraulic-fluid outlet, said pipe extending radially from the outlet to the radially external barrel, passing through the secondary stream, said pipe being situated, at least partly, in a cowling extending in the secondary stream.

7. An intermediate casing according to claim 1, wherein the arm comprises at least one hydraulic-fluid inlet situated upstream of the transmission shaft.

8. An intermediate casing according to claim 7, wherein the hydraulic-fluid inlet is formed in a radially inner hub.

9. An intermediate casing according to claim 1, wherein a radially internal end of the hollow arm emerges in a chamber formed by an inner hub.

10. An intermediate casing according to claim 1, wherein at least an inner hub and the bypass channel or pocket of the intermediate casing are made in one piece by casting.

11. A turbofan comprising at least one intermediate casing according to claim 1.

* * * * *

UNITED STATES PATENT AND TRADEMARK OFFICE
CERTIFICATE OF CORRECTION

PATENT NO. : 9,909,455 B2  
APPLICATION NO. : 14/794005  
DATED : March 6, 2018  
INVENTOR(S) : Cameau et al.

Page 1 of 1

It is certified that error appears in the above-identified patent and that said Letters Patent is hereby corrected as shown below:

On the Title Page

Column 1:
(73), Assignee should read: Snecma, Paris (FR)

Signed and Sealed this  
Twenty-fourth Day of July, 2018

Andrei Iancu  
*Director of the United States Patent and Trademark Office*